United States Patent [19]

Link et al.

[11] Patent Number: 4,733,585
[45] Date of Patent: Mar. 29, 1988

[54] FEEDING DEVICE FOR A TOOL SLIDE OF A MACHINE TOOL

[75] Inventors: Helmut F. Link, Aichwald; Walter Grossmann, Baltmannsweiler, both of Fed. Rep. of Germany

[73] Assignee: Index-Werke Komm.-Ges. Hahn & Tessky, Fed. Rep. of Germany

[21] Appl. No.: 899,240

[22] Filed: Aug. 22, 1986

[30] Foreign Application Priority Data

Mar. 13, 1986 [DE] Fed. Rep. of Germany ... 8606976[U]

[51] Int. Cl.⁴ ............................................. B23B 21/00
[52] U.S. Cl. ................................... 82/21 A; 82/24 R; 92/115; 137/625.65; 408/130.
[58] Field of Search .............. 82/21 A, 24 R; 408/63, 408/64, 130; 409/170, 219; 91/35; 137/625.65; 92/113, 114, 115

[56] References Cited

U.S. PATENT DOCUMENTS 3,726,184 4/1973 Saito ......................................... 91/35
3,797,364 3/1974 Schulze .................................... 91/35

FOREIGN PATENT DOCUMENTS 718634 2/1980 U.S.S.R. .................................... 91/35

Primary Examiner—Nicholas P. Godici
Assistant Examiner—Samuel M. Heinrich
Attorney, Agent, or Firm—Ledig, Voit & Mayer

[57] ABSTRACT

The invention relates to a feeding device for a tool slide of a machine tool of a simple, compact and economical construction comprising an electro-hydraulic linear amplifier easily accommodated in the constructional space of a hydraulically operated tool slide. The valve housing is inserted into the piston rod on the side of the piston remote from the control valve means thereby allowing for a plurality of tool slides to be arranged in a very compact space. The valve means forms a cartridge which can be simply inserted into the cylinder chamber formed by the cylinder housing. The arrangement of the control valve means in the cylinder housing and the rigid connection between the motor and the piston result in compact design and in shorter conduits for the hydraulic fluid between the control valve means and the cylinder chambers thereby leading to a high rigidity of the feeding device.

7 Claims, 2 Drawing Figures

FEEDING DEVICE FOR A TOOL SLIDE OF A MACHINE TOOL

DESCRIPTION OF THE INVENTION

The invention relates to a feeding device for a tool slide of a machine too, in particular a so-called cross slide, namely a feeding device of the type comprising an electro-hydraulic linear amplifier having an electromotor and comprising a piston with a hollow piston rod, a threaded spindle inserted into the piston rod and penetrating the piston, this threaded spindle also being connected to the electromotor, a cylinder housing guiding the piston and forming a cylinder chamber on both sides thereof and a control valve means including a valve housing disposed adjacent the cylinder chamber located on the side of the piston remote from the piston rod. An electro-hydraulic linear amplifier of this type is known, for example, from German laid-open paper DE-OS No. 20 62 134.

Generally, the slides of a machine tool, including the tool slides, are driven, i.e. displaced, by means of D.C. or three-phase current motors via so-called ball planetary gears. The motor hereby actuates the threaded spindle of the ball planetary gear and the nut of the latter is rigidly connected to the slide. A drive means of this type via ball planetary gears often causes problems in machine tools comprising a number of slides for reasons of space and cannot be used in the working space of a machine tool for reasons of lubrication.

The known electro-hydraulic linear amplifiers also require a relatively large space and cannot be used, above all, with small machine tools in the region of their working spaces. The known electro-hydraulic linear amplifier, as shown in FIG. 1 of DE-OS No. 20 62 134, comprises a control valve means which is mounted on one end face of the hydraulic cylinder housing and is penetrated by the threaded spindle. The shaft of the electromotor (stepping motor or D.C. motor), which drives this spindle and is arranged on the side of the control valve means remote from the hydraulic cylinder, is in rotary drive connection with the threaded spindle. This allows longitudinal displacement of the threaded spindle relative to the motor shaft. In addition, the threaded spindle has a shoulder, with which four valves of the control valve means are actuated, as well as an external thread which is threaded into an internal thread in the hollow piston rod. When the threaded spindle is rotated, its shoulder is displaced in axial direction and this causes hydraulic oil to be conveyed to one of the two sides of the piston. This will result in displacement of the piston and, with it, the threaded spindle until the shoulder of the threaded spindle reaches its neutral central position. This means that the piston and the piston rod have been displaced in relation to the original state.

The object of the invention was therefore to provide a feeding device for tool slides of a machine tool which is as compact as possible, namely a feeding device comprising an electro-hydraulic linear amplifier which may be easily accommodated in the constructional space of a hydraulically operated tool slide.

Proceeding on the basis of a feeding device of the type described at the beginning, this object may be accomplished in accordance with the invention in that the valve housing is inserted into the cylinder housing and the electromotor is rigidly connected to the piston rod on the side of the piston remote from the control valve means. The type of construction hereby achieved is thus so compact that a plurality of tool slides may be arranged in a very confined space and the problems regarding space, which are encountered with lathes having one or more spindles, can be solved. In the inventive feeding device the control valve means forms a type of cartridge which may be simply inserted into the cylinder chamber formed by the cylinder housing. The arrangement of the control valve means in the cylinder housing and the rigid connection between the motor and the piston rod and, with it, the tool slide result not only in a particularly small construction of the feeding device, both in axial direction and at right angles thereto, but also in shorter lines or conduits for the hydraulic fluid between the control valve means and the cylinder chambers and this leads to a very high rigidity of the inventive feeding device. The electromotor is rigidly connected to the piston rod and, with it, the slide and so no longitudinal displacement between motor and threaded spindle will occur in the inventive feeding device. Such longitudinal displacements do occur in the known electro-hydraulic linear amplifiers and have to be compensated. Finally, the rotating masses may be kept very small in the inventive feeding device and so the threaded spindle can be driven at a high rotational speed and, consequently, may be provided with a smaller thread pitch which has the advantage of an improved accuracy in positioning.

When the connection between the threaded spindle and the electromotor is mentioned in the aforesaid, this connection may be either direct of indirect. In a particularly preferred embodiment, the electromotor is mounted on the tool slide, to which the piston rod is also rigidly connected. In a preferred embodiment of the inventive feeding device, the valve housing of the control valve means limits the cylinder chamber located on the one side of the piston in axial direction.

It is particularly favourable for the cylinder housing to have a closable opening at least in one end face for insertion of valve housing, piston, piston rod and threaded spindle. The valve housing then accommodates a plurality of valves or a valve slide, according to the design of the control valve means. In a feeding device of this type, all the movable parts, together with the valve housing, may be inserted into the cylinder housing from one side as one unit.

Additional features, advantages and details of the invention result from the attached claims and/or the following description as well as from the attached drawings of two preferred embodiments of the inventive feeding device. In the drawings, FIG. 1 is an axial section through a first embodiment with tool slide and FIG. 2 is an axial section through the cylinder of the second embodiment.

DETAILED DESCRIPTION OF THE PREFERRED EMBODIMENT

Figure 1:
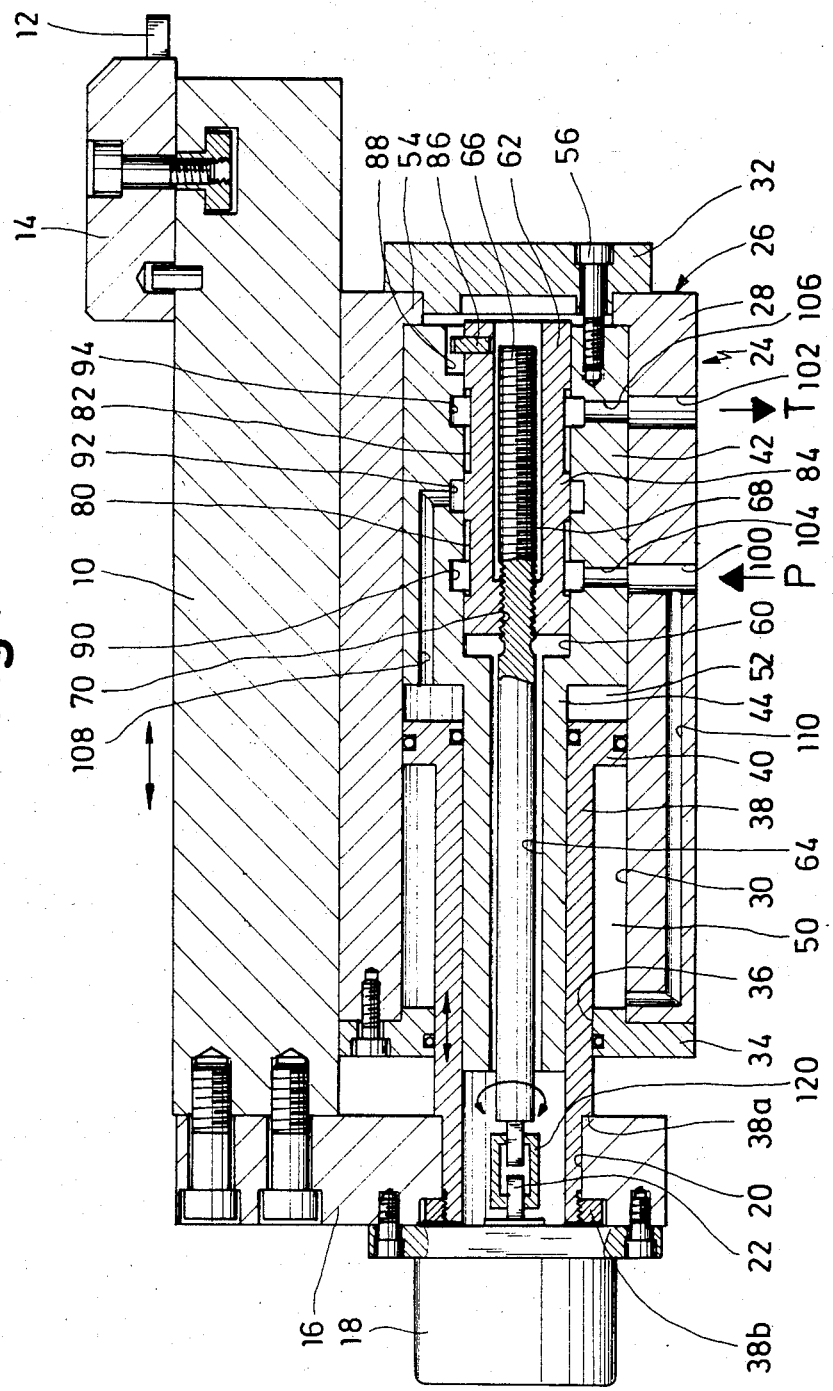

FIG. 1 is a sectional view of a tool slide 10. This mounts a tool holder 14 equipped with a tool 12. As is customary, the tool slide is guided for displacement by guide means on a bed of a machine tool which has not been illustrated. A holder means 16 is screwed to the tool slide 10. An electric stepping motor 18 is secured to this holder means and has an opening 20 into which a shaft 22 of the stepping motor 18 protrudes.

The tool slide 10 and the holder means 16 engage over a hydraulic linear amplifier which is designated as a whole as 24 and has a three-part cylinder housing 26. This housing is stationary once the tool slide has been assembled, i.e. it is normally rigidly connected to the bed or frame of the machine tool. The housing comprises a casing 28 with a cylindrical bore 30 as well as two covers 32 and 34 secured to the casing 28 by means of screws. The cover 34 has a guide opening 36 in which a hollow piston rod 38 is guided so as to be displaceable and sealed (by an O-ring). A piston 38,40 guided with piston collar 40 is one piece of the piston rod 38. The left-hand end, according to FIG. 1, of the piston rod 38 is inserted into the opening 20 in the holder means 16 and rigidly connected to the holder means in axial direction via a shoulder 38a as well as a nut 38b threaded onto an external thread of the piston rod.

Approximately the right-hand half of the bore 30 in the cylinder housing 26 is taken up by a valve housing 42 which is inserted into the bore 30 so as to fit sealingly therein and has a shaft-like hollow extension 44 which engages and fits into the hollow space in the piston rod 38. Two O-rings serve to seal the piston 38, 40 against the wall of the bore 30 and the circumferential face of the extension 44. In this way, two cylinder chambers 50 and 52 are created on either side of the piston collar 40, one of these chambers being limited in axial direction by the valve housing 42.

The casing 28 of the housing has an interior shoulder 54 which is accommodated between the cover 32 and the valve housing 42 so that the screws 56 serving to mount the cover 32 also serve to hold the valve housing 42 in position in the cylinder housing 26.

The valve housing 42 has a valve bore 60 for accommodating a valve slide 62 and, following on therefrom, a longitudinal bore 64, which has a smaller diameter, for passage of a threaded spindle 66 which has an external thread 68 threaded into an internal thread (70) in the valve slide 62. The latter is designed as a hollow sleeve so that the valve slide 62 may be displaced in axial direction due to rotation of the threaded spindle 66.

The valve slide 62 is seated in the valve bore 60 of the valve housing 42 such that it fits exactly and has two circumferential grooves 80 and 82 which form a shoulder 84 between them. In addition, a wedge member 86 is secured in the valve slide 62. This wedge member engages in a longitudinal groove 88 in the valve housing 42 and thus prevents the valve slide 62 from turning when the threaded spindle 66 rotates.

Three annular grooves 90, 92 and 94 are worked into the wall of the valve bore 60 of the valve housing 42. A connection 100 for hydraulic oil and an outlet 102 for hydraulic oil are located in the casing 28. As indicated by the arrow "P", the pressure P of the hydraulic system of the machine tool is constantly applied to the inlet 100 whereas hydraulic oil is not subjected to any pressure at the hydraulic oil outlet 102 and can therefore escape in the direction of arrow "T". The hydraulic oil connection 100 is connected to the annular groove 90 via a bore 104 in the valve housing 42 and the hydraulic oil outlet 102 is connected to the annular groove 94 via a bore 106. A bore 108 leads from the annular groove 92 into the cylinder chamber 52 while a bore 110 leads from the hydraulic oil connection 100 into the left-hand end region of the cylinder chamber 50.

Finally, a coupling 120 serves to connect the ends of the shaft 22 and the threaded spindle 66, which are designed, for example, as square portions, so that they do not rotate relative to one another but in such a manner that the threaded spindle 66 is firmly connected to the shaft 22 in axial direction.

The inventive feeding device shown in FIG. 1 has a so-called two-edge valve slide 62 and so the full feeding power is available only for displacing the piston 38,40 to the right in FIG. 1. FIG. 1 shows the valve slide 62 in its neutral central position in which the annular groove 92 is closed by the shoulder 84. If the stepping motor 18 turns the threaded spindle 66 such that the valve slide 62 is displaced to the right in accordance with FIG. 1, the hydraulic oil connection 100 is connected via the bore 104, the annular groove 90, the circumferential groove 80 and the annular groove 92 with the bore 108 and, thereby, the cylinder chamber 52. As the hydraulic oil connection 100 is always connected to the cylinder chamber 50 via the bore 110, the piston 38,40 acts only as a differential piston sine the right-hand operative piston surface is larger than the left-hand operative piston surface. The piston then displaces the tool slide 10 to the left in accordance with FIG. 1 and, in accordance with the invention, the shaft 22 of the stepping motor 18 mounted on the holder means 16 draws the threaded spindle 66 along the same path towards the left, via the coupling 120, until the shoulder 84 of the valve slide 62 has closed the annular groove 92 again. If the stepping motor 18 turns the threaded spindle 66 such that the valve slide 62 is displaced to the left in relation to the valve housing 42, the circumferential groove 82 connects the annular grooves 92 and 94 with one another and thereby the cylinder chamber 52 with the hydraulic oil outlet 102. This means that the cylinder chamber 52 is then no longer subjected to pressure and the system pressure P applied to the cylinder chamber 50 displaces the piston 38,40 to the right. Since this causes the threaded spindle 66 and the valve slide 62 to be moved to the right as well, via the holder means 16 and the stepping motor 18, its shaft 22 and the coupling 120, the piston 40 continues to be displaced until the annular groove 92 is again closed by the valve slide 62.

A quite considerable advantage of the inventive feeding device is therefore the fact that in contrast to the known electro-hydraulic linear amplifier described at the outset no relative axial displacement is required between threaded spindle and electromotor and so the motor shaft and the threaded spindle can be rigidly connected to one another.

Figure 2:
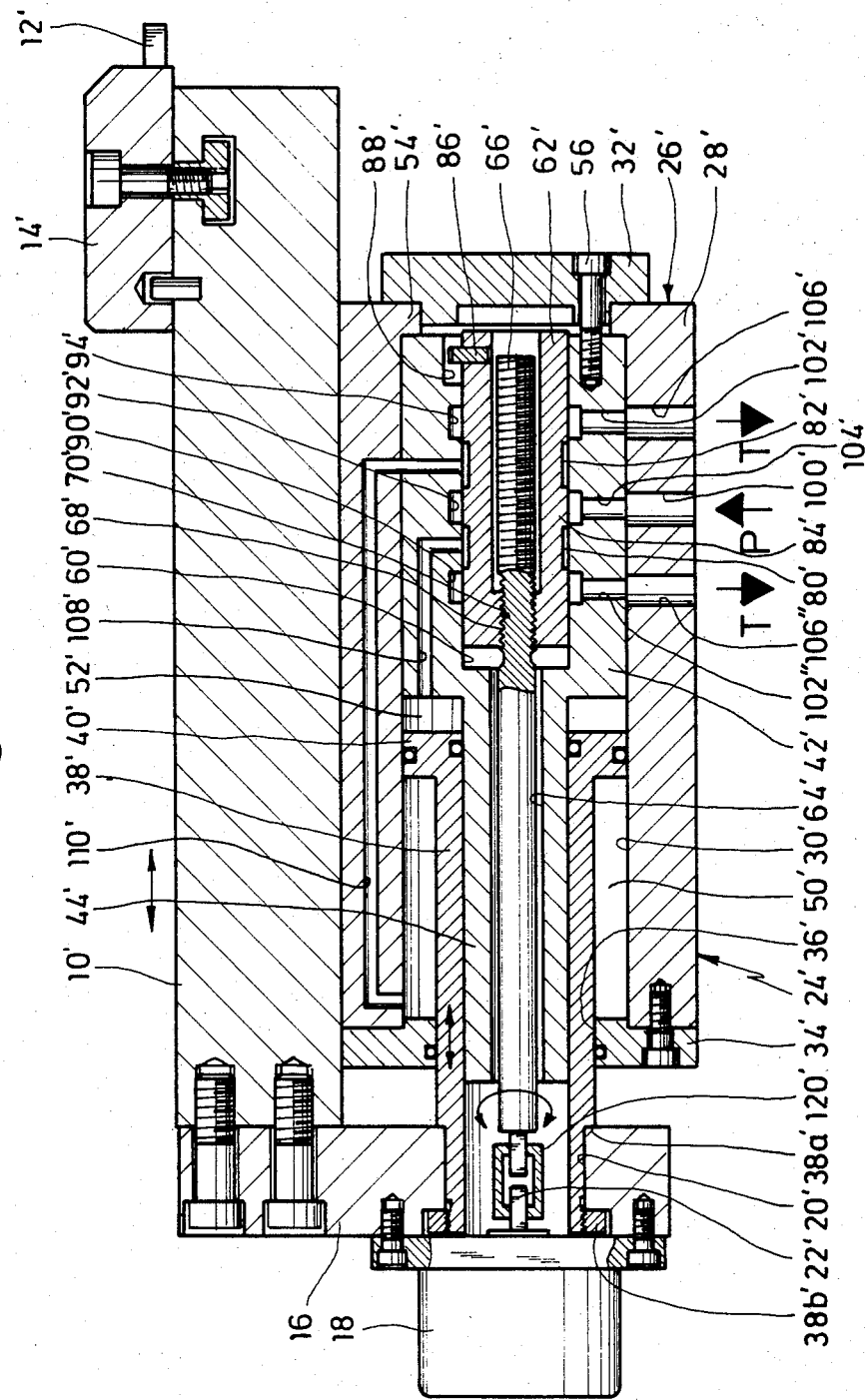

FIG. 2 shows a variation of the inventive feeding device having a four-edge valve slide which allows full feeding power to be generated in both directions. As the embodiment of FIG. 2 differs from that of FIG. 1 only in this one point and slide valves having a four-edge control are known per se, it is unnecessary to go into further detail concerning the parts shown in FIG. 2. Where these parts correspond to those of the embodiment according to FIG. 1, the same reference numerals have been used but with the addition of an apostrophe.

What is claimed is:

1. A feeding device for a tool slide of a machine tool including an electro-hydraulic amplifier having a cylinder housing, in which a piston is guided with a piston collar for longitudinal movement, said piston being provided with an axial channel and a hollow piston rod penetrating an end wall of the cylinder housing and having a free end portion outside said cylinder housing, an electromotor with a housing and a rotatable drive shaft, said housing being fixed to the free end portion of the piston rod, said cylinder housing having a first cylinder chamber between said end wall and said piston collar, a second cylinder chamber adjacent the side of the piston collar remote from the first cylinder chamber and a third cylinder chamber on the side of the second cylinder chamber remote from the piston collar, control valve means comprising a valve housing and a valve member in said valve housing, said control valve means being fixedly disposed in said third cylinder chamber, a threaded spindle extending through the hollow piston rod and the axial channel of said piston, said spindle being connected to the drive shaft of said electromotor and in operative connection with said valve member.

2. A feeding device as defined in claim 1 wherein said cylinder housing has a closable opening at least in one end face for insertion of said valve housing, piston, piston rod and threaded spindle.

3. A feeding device as defined in claim 2 wherein said opening is closed by a cover.

4. A feeding device as defined in claim 2 wherein said opening is provided on the side of said cylinder housing facing the motor.

5. A feeding device as defined in claim 1 wherein said control valve means is designed as a slide valve and a valve slide secured against rotation is guided for displacement in a longitudinal bore in said valve housing and said valve slide has a threaded bore with an internal thread, said threaded spindle being threaded into said internal thread.

6. A feeding device as defined in claim 1 wherein said valve housing has a hollow extension portion engaging and fitting into the hollow space of said piston rod, said hollow extension portion being penetrated by said threaded spindle.

7. A feeding device as defined in claim 3 wherein said opening is provided on the side of said cylinder housing facing the motor.

* * * * *